May 30, 1950

K. A. OPLINGER ET AL 2,509,446

VELOCITY REGULATING APPARATUS

Filed Aug. 24, 1944

INVENTORS
KIRK A. OPLINGER,
CLINTON R. HANNA,
LAWRENCE B. LYNN,
BY
a. B. Reavis
ATTORNEY

INVENTORS
KIRK A. OPLINGER,
CLINTON R. HANNA,
LAWRENCE B. LYNN.
BY
ATTORNEY

May 30, 1950 K. A. OPLINGER ET AL 2,509,446
VELOCITY REGULATING APPARATUS
Filed Aug. 24, 1944 4 Sheets-Sheet 4

INVENTORS
KIRK A. OPLINGER,
CLINTON R. HANNA,
LAWRENCE B. LYNN.
BY
ATTORNEY

Patented May 30, 1950

2,509,446

UNITED STATES PATENT OFFICE 2,509,446

VELOCITY REGULATING APPARATUS

Kirk A. Oplinger, Verona, Clinton R. Hanna, Pittsburgh, and Lawrence B. Lynn, Wilkinsburg, Pa., assignors to Westinghouse Electric Corporation, East Pittsburgh, Pa., a corporation of Pennsylvania Application August 24, 1944, Serial No. 551,034

18 Claims. (Cl. 318—19)

Our invention relates to a body capable of movement about an axis and it has for an object to provide apparatus effective on the body about said axis so as to minimize deviations in angular velocity, including zero angular velocity, of such body about said axis and relative to space, such angular velocity of the body about said axis and relative to space being hereinafter referred to as "absolute angular velocity."

A more particular object of the invention is to provide a motor acting on a member about an axis and a gyro mounted to precess, that is, develop torque in proportion to angular velocity of the member about said axis together with means controlled by opposing influences of a variable moment applied to the gyro and the couple developed by the latter due to angular movement of the member about said axis in order that the gyro may govern the motor to rotate the member about the mounting axis at an absolute angular velocity in accordance with the magnitude of the applied moment.

An important application of the present invention is to aircraft turret guns. If the structure for supporting a gun, or directable body member, and the target or object are both fixed, then direction or aiming requires merely appropriate adjustment of the gun or body member about the azimuth and elevation axes. If the supporting structure and the target move relatively in relation to space, then it is necessary that the gun move at the absolute velocities required about the azimuth and elevation axes to keep it on or tracking the target. If the relative movement is entirely angular, then the requirement is merely one of stabilization, that is, to maintain zero absolute angular velocity of the gun about each axis. If the relative movement is translatory, then movement of the gun about one or both of the axes at the required absolute angular velocities is necessary to keep it on the target. In general, it is necessary to provide for movement of the gun to compensate for movements thereof about its azimuth and elevation axes in relation to the target and due to movement of its supporting structure relative to the latter, that is, it is necessary to minimize deviations in absolute angular velocities required about the azimuth and elevation axes in order to keep the gun on or tracking the target. If the translatory component of the relative motion is zero, then it is only necessary to stabilize the gun or minimize deviations in zero absolute angular velocity about the azimuth and elevation axes, and, if the translatory component of the relative motion is not zero, then it is necessary to minimize deviations in the absolute angular velocities required about one or both of the axes to keep the gun on the target. The problem is, therefore, one of regulating absolute angular velocities, including zero absolute angular velocity and any set-in angular velocity so as to minimize deviations in such velocities. Deviations are minimized by means of motors for driving the gun about the azimuth and elevation axes and controlled in response to moments of variable magnitude applied about the precession axes of the gyros movable angularly with the gun about the azimuth and elevation axes and arranged to precess in response to velocities about such axes in order that the gyros may govern the motors to drive the gun about the azimuth and elevation axes at absolute angular velocities determined by the magnitudes of the moments. In this connection, as each gyro responds to angular velocity relative to space, or absolute angular velocity, it is immaterial whether such velocity is due to the motor, to movement of the supporting structure, or both. Each gyro, therefore, acts in response to the absolute angular velocity to govern the associated driving motor to minimize deviations in absolute angular velocity. Thus, the gun or body member may be kept on the target or object or in tracking relation with respect to the latter merely by setting in the required absolute angular velocities about the azimuth and elevation axes, this being accomplished by biasing devices which are effective to apply moments to the gyros about their precession axes and which are adjustable to vary the moments in direction and magnitude.

A further object of the invention is to provide a structure capable of movement about an axis and a motor for controlling motion of the structure about said axis together with means including a gyro carried by the structure and which precesses, that is, develops torque, in response to angular velocity of the structure about said axis and relative to space for controlling the motor so as to minimize deviations in absolute angular velocity of the structure about said axis.

Another object of the invention is to provide a member pivotally mounted on structure movable relative to space and a motor for driving the member about the mounting axis and controlled by means responsive to a moment applied about the precession axis of a gyro to connect an energy supply to the motor and responsive to the gyroscopic couple of the gyro mounted so as to precess in response to angular velocity of the member about the mounting axis to interrupt the energy supply, whereby the gyro functions to control the energy input to the motor so that the latter is governed to drive the mounting member at an absolute angular velocity dependent upon the magnitude of the moment.

A further object of the invention is to provide a movable supporting structure and a gun or body member carried thereby and movable about azimuth and elevation axes together with motors controlled by gyros responsive to velocities about the azimuth and elevation axes so as to drive the gun or member about such axes and relative to the supporting structure to minimize deviations in angular velocity, including zero angular velocity, of the gun or member about each axis and relative to space.

A further object of the invention is to provide systems for regulating angular velocities of a gun about azimuth and elevation axes and controlled by a manually-operable member having two degrees of freedom of movement utilized to control the respective systems, the systems including motors for driving the gun relative to its supporting structure and about the azimuth and elevation axes and controlled by precession of gyros arranged to precess in response to velocities of the gun about such axes and relative to space so as to minimize deviations in absolute velocities about such axes and including zero absolute velocities or any set-in absolute velocities secured by adjustment of the manually-controllable member.

A further object of the invention is to provide apparatus of the above character wherein magnetic means is used to apply a moment to each gyro about its precession or output torque axis and provision is made to overcome the negative stiffness of such means to facilitate centering of the gyro.

A further object of the invention is to provide apparatus of the above character wherein the motor for driving a pivotally-mounted member is controlled by a pair of outer contacts and an intermediate contact movable with the gyro about its output torque or precession axis to engage and disengage the outer contacts and wherein the intermediate contact is connected to the gyro by a spring arm which deflects to provide for cushioned engagement of contacts.

A further object of the invention is to provide apparatus of the above character wherein the gyro operates a movable contact to engage and disengage relatively fixed contacts to control the motor and wherein sensitivity of the apparatus is decreased and stability of operation thereof is increased by providing each gyro with a small amount of rotational unbalance and by providing the gyro with a spring arm carrying the movable contact and having such natural frequency in relation to speed of the gyro rotor that the contacts are subject to a vibratory condition of operation away from resonance.

A further object of the invention is to provide structure which is stabilized angularly by means including a gyro carried by the structure and connected to the latter by damper means effective to minimize the transmission of undesired oscillatory effects from such structure to the gyro.

Another object of the invention is to provide means including a gyro carried by a structure for stabilizing the latter angularly and wherein the gyro is connected to the structure by means providing a stabilizing transmission connection and operative as a filter to minimize the transmission of undesired vibratory effects from the structure to the gyro.

These and other objects are effected by the invention as will be apparent from the following description and claims taken in connection with the accompanying drawings, forming a part of this application, in which:

In the drawings, there is shown a mobile directable element and elevation and azimuth servo-motor systems operative to control its direction. Each servo-motor system includes a motor operative to control angular movement of a body or structure with respect to an axis in response to an applied moment and torque of a gyro so that the absolute velocity of the body or structure with respect to its movement axis depends in magnitude and direction upon the magnitude and direction of the applied moment. For example, where the body or structure is a gun, the servo-motor system controls movement thereof about the trunnion axis; and, where the body structure is a turret, the servo-motor system is effective about the turret axis. Assuming that contacts of the motor of the servo-motor system are closed by a magnetic moment, then the motor is energized to move the body or structure about its axis and the gyro operates, pursuant to such angular movement of the body or structure, to open the contacts. As long as the magnetic moment remains effective, the motor contacts will be operated in a hovering manner—the magnetic moment tending to close the contacts and gyro torque tending to open them—to regulate the absolute angular velocity of the body or structure about its movement axis in response to the magnitude of the magnetic moment. In order that the gyro may operate in this manner, it is essential to have a particular relation thereof both with respect to the body or structure and to the motor contacts, that is, the movable contact is connected to the gyro for movement due to gyro torque about the output axis and the gyro is carried by the body or structure with the movement axis of the latter extending transversely of the rotor spin axis to constitute the gyro input axis so that angular velocity thereabout is accompanied by proportional torque of the gyro about its output axis. The servo-motor system, therefore, operates to provide for absolute velocity of the body or structure about its movement axis dependent in direction and magnitude upon the direction and magnitude of the applied magnetic moment.

Figure 12:
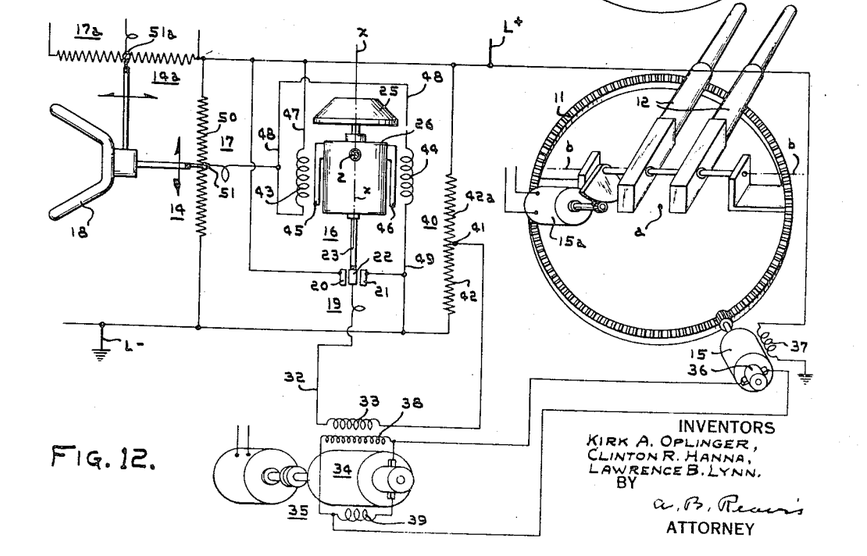
Fig. 12 is a diagrammatic view illustrating one arrangement of the control system.

Referring to the drawings in greater detail, there is shown movable structure 10, for example, fuselage structure of an airplane, having a turret 11 pivotally mounted thereon about the azimuth axis $a$—$a$, and gun 12 is pivotally mounted in the turret about the elevation axis $b$—$b$. As shown in Fig. 12, the gun may consist of a pair of guns connected together and operating as a unit.

Figures 1, 2:
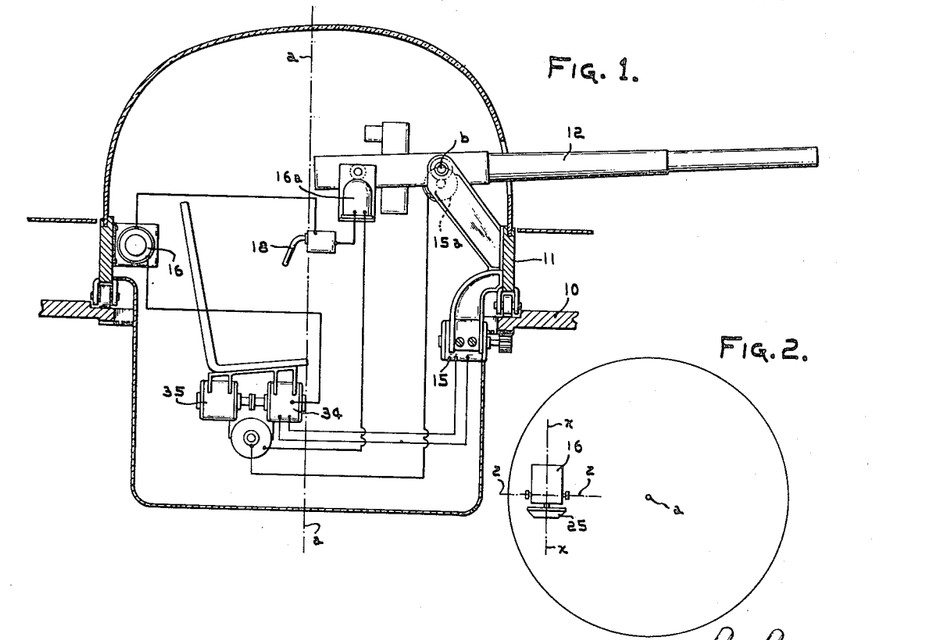
Fig. 1 is a view showing a turret and its supporting structure in section, showing the gun in elevation, and showing diagrammatically the systems for controlling movements about azimuth and elevation axes and relative to the supporting structure.
Fig. 2 is a diagrammatic view showing the relation of a gyro about the axis, azimuth or elevation, about which it is effective.

Power means or systems, at 14, and, at 14a, are employed for effecting the angular movements required about the azimuth and elevation axes to direct the gun and keep it on the target. The system, at 14 includes a motor 15 controlled by means of a gyro, at 16, and a potentiometer, at 17. In like manner, the system 14a includes a motor 15a effective about the elevation axis $b$—$b$ and controlled by means of the gyro at 16a and by the potentiometer at 17a. The potentiometers are adjusted by a manually-controllable member 18 having one degree of freedom of movement for adjusting the potentiometer 17 and another degree of freedom of movement for adjusting the potentiometer 17a.

As the systems are generally alike, the description of the structure and operation of one will suffice for both. Referring to a system, at 14, effective about the turret or azimuth axis $a$—$a$, the electric motor 15 is connected to the turret 11 to move the latter about its mounting axis $a$—$a$ and relative to the supporting structure 10. Energy medium or electric current is supplied to the motor so as to operate the latter in either direction at the required speed. The motor is rendered effective in opposite directions by the control or contact device, at 19, including outer contacts 20 and 21 carried by the turret and an intermediate contact 22. If the intermediate contact 22 engages the contact 20, the motor operates in one direction and if it engages the contact 21 it operates in the other direction. The contact 22 is movable in response to two influences, namely, that of the gyro, at 16, and that of the potentiometer, at 17.

The gyro, at 16, is mounted on the turret so that the later forms a part of the gyroscopic system, that is, the mounting or azimuth axis $a$—$a$ constitutes one of the three degrees of freedom of such a system. The gyro is mounted on the turret with its spin axis $x$—$x$ in substantially normal transverse relation with respect to the azimuth axis $a$—$a$ and with its precession or output torque axis $z$—$z$ in normal relation both to the azimuth axis $a$—$a$ and the spin axis $x$—$x$. The intermediate contact 22 is connected to move with the gyro about the precession or output torque axis $z$—$z$. The gyro 16a is similarly mounted in relation to the elevation axis and operates a similar arrangement of contacts.

As shown, the movable contact 22 is connected to its gyro by a spring arm 23 to move with the latter, the spring arm providing for cushioned engagement of the contact 22 with the contacts 20 and 21. Stops 24, 24 limit precessional displacement of the gyro, they engage the spring arm after a suitably small deflection of the latter following contact engagement.

Each of the potentiometers, at 17, and, at 17a, is adjustable to apply moments in either direction with respect to the precession axis of its gyro and to vary the moment in each direction from zero to a maximum. Assuming adjustment in magnitude of the moment, the gyro moves in consequence about its precession axis to engage the movable contact 22 with one of the contacts 20 and 21, whereupon the motor is energized to move the turret or the gun, as the case may be, about its mounting axis, such angular movement of the turret or gun developing a gyroscopic couple proportional to the velocity of movement and opposing movement by interruption of the energy supply to the motor. Just as soon as the gyroscopic couple balances the applied moment, the contacts begin operating in a hovering or vibratory manner, any tendency of the gyroscopic couple to exceed the moment opening the contacts in response to the preponderant effect of the couple and any tendency thereof to follow below the moment closing the contacts in response to the preponderant effect of the moment. The gyro, therefore, operates to govern the motor to drive the turret or the gun at an absolute angular velocity corresponding to the potentiometer moment magnitude setting. If the potentiometer is set for zero moment, then the gyro can operate only in response to absolute angular velocity deviations given to its pivotally-mounted member by the movable structure carrying the later, the velocity of such a deviation being applied as input to the gyro to cause the latter to develop proportional torque about its output axis $z$—$z$ to operate the contacts to govern the motor to drive the movable member so as to minimize deviations in absolute angular velocity thereof and which absolute angular velocity would be zero for zero setting of the moment. If the applied moment is zero, then the gyro governs the motor to operate the member so as to minimize deviation in zero absolute velocity thereof; and, for any other moment magnetitude setting, it governs the motor for minimizing deviations in absolute angular velocity of the movable member corresponding to the moment setting. Therefore, in all cases, the gyro controls the motor to drive the movable member so as to regulate the absolute angular velocity of the latter.

Considering first only the turret and the control system, at 14, and assuming adjustment of the potentiometer, at 17, for zero moment, any movement of the supporting structure relative to space and tending to move the turret angularly with it is sensed by the gyro, the latter moving about the axis $z$—$z$ in response to velocity of such angular movement relative to space to engage the contact 22 with either of the contacts 20 or 21, dependent upon the direction of the velocity, to control the motor 15 to move the turret 11 relative to the structure 10 so as to minimize deviation in the angular relation of the turret about the azimuth or mounting axis $a$—$a$ and relative to space.

If the supporting structure 10 turns in either direction, then the gyro, at 16, responds to control the motor 15 to minimize deviation in absolute angular velocity of the turret about the azimuth axis $a$—$a$, any such deviation in velocity being accompanied by proportional torque in accordance with the gyrodynamic relation $T=I_sw_sW$ (where T is torque, $I_sw_s$ is angular momentum about the spin axis, and W is angular velocity about an axis at right angles to the spin axis and to the torque axis) to operate the contacts for motor operation to reduce the deviation. Assuming the tendency to absolute velocity deviation is due to turning of the supporting structure in one direction and in consequence of which the gyro torque causes engagement of the contact 22 with the contact 20, then the motor 15 will be operated in the proper direction to move the turret to compensate for turning of the supporting structure so as to minimize deviation in zero angular velocity of the turret about the azimuth axis. Any tendency of the motor to over-compensate would involve deviation in absolute angular velocity in the other direction with the result that the contact 22 would engage the contact 21 to minimize such deviation. On the other hand, should the supporting structure turn in azimuth in the other direction, then the reverse regulating operation would take place, the gyro operating to provide a torque proportional to the velocity of deviation causing the contact 22 to engage the contact 21 to control the motor 15 to drive the turret so as to minimize deviation in absolute zero angular velocity about the azimuth axis, any tendency of the motor to over-compensate, as before, resulting in the contact 22 engaging the contact 20 to minimize zero absolute velocity deviation in the other direction.

The operation so far described is sufficient so long as it is required only to effect regulation or to minimize the deviation in zero absolute velocity, that is, where only compensation for angular motion of the supporting structure has to be made, or, as long as the translatory component of the relative motion of the supporting structure and the target is zero; however, where the relative motion of the supporting structure and the target has a translatory component which is not zero in relation to space, then it is necessary to feed or to set in an absolute velocity in order to track the object or target. This is done by applying to the gyro about its precession axis $z$—$z$ a moment in the direction and of the magnitude required. Such moment provides a set-in absolute velocity dependent upon magnitude of the moment and the gyro operates to minimize any deviation in such absolute velocity. If the moment applied is zero, then the set-in absolute velocity is zero, the gyro 16 governing for zero absolute velocity to minimize deviations in such zero absolute velocity; however, if movement of the turret about the mounting axis and relative to space is required in order to keep the gun on the target, then the provision for feeding or setting in the required absolute velocity is effective for this purpose, the gyro then governing the absolute turret velocity to minimize deviations in the latter.

The other control system, at 14a, is effective about the elevation or gun mounting axis $b$—$b$, the gyro, at 17a, operating to minimize deviation in absolute angular velocity, including absolute zero velocity or any set-in absolute velocity.

By properly controlling devices to vary the applied moments in magnitude and direction, the set-in absolute velocities about the azimuth and elevation axes $a$—$a$ and $b$—$b$ are provided to follow a target moving in any direction, the gyros functioning to minimize deviations in such absolute angular velocities so that the gun may be kept on the target.

Referring now to Figs. 3 to 9, inclusive, for an understanding of the gyros, at 16, and at 16a, each gyro includes a spinning body 25 journaled in an inner frame 26. A gimbal ring 27 is pivotally connected at 28, 28 to the inner frame about an inner tilt axis, that is, the precession axis $z$—$z$, and it is pivotally connected to the outer frame 29, at 30, 30, about the outer tilt axis $y$—$y$. A friction damper connection, at 31, connects the gimbal ring 27 to the outer frame 29 and it is effective about the outer tilt axis $y$—$y$, such damper connection serving to minimize the transmission of oscillatory disturbances to the gyro and which may be occasioned for any reason, such as an unbalanced moment about the azimuth axis $a$—$a$ of one of the guns of the pair of Fig. 12 in the event that firing of the gun or guns should apply moments to the turret effective about its mounting axis.

Precession of the gyro, at 16, about its precession axis $z$—$z$ in response to absolute angular velocity of the turret about the mounting or azimuth axis $a$—$a$ results in the contact operation heretofore described, so that the gyro controls the input of energy to the motor 15 so as to govern the turret absolute velocity corresponding to the magnitude of the controlling moment applied to the gyro. Similarly, the gyro, at 16a, carried by the gun 12 precesses in response to absolute angular velocity of the latter about the elevation axis $b$—$b$ to engage similar contacts for controlling the motor 15a.

As shown in Fig. 12, the relatively fixed contacts 20 and 21 are connected to opposite sides of the line L+ and L—, respectively, and the intermediate contact 22 is connected to a conductor 32 including the field element 33 of the generator, at 34, of the motor generator set, at 35, the armature of the generator, at 34, being connected in series with the armature 36 of the motor 15, the latter having a separately excited field 37. The generator, at 34, has a shunt field 38 and a small differential series field 39 operating to compensate the excitation of the shunt field for changes in output loading. The exciting field 33 determines the polarity of the generator in accordance with engagement of the movable contact 22 with the contacts 20 and 21, and smooth performance is obtained by limiting the ampere-turns in the exciting field 33 to approximately 35 per cent of the total required for full output speed, the remaining ampere-turns being supplied by the shunt field 38. Not only does the gyro-stabilizer operate to hold the output speed of the turret automatically with reference to space when the angular velocity of the supporting structure or airplane is changed, except for a small slip or deviation necessary for operation of the contacts to render the regulating system effective, but, because of the features of construction of the servo-generator, at 34, such gyro-stabilizer will maintain the turret speed or absolute velocity with changes in output loading throughout the range of the regulator.

With the movable contact 22 engaging either of the contacts 20 and 21, the circuit for the exciting field 33 is closed with a portion of the resistor, at 40, in series with the field. To provide for this, one terminal of the field is connected to the resistor at an intermediate point 41. If the movable contact engages the contact 20, the resistance portion 42 is in series, and, if it engages the contact 21, the resistance portion 42a is in series.

When the polarity of the exciting field 33 has been determined by the engagement of the movable contact 22 with either contact 20 or 21, the generator output polarity is fixed and self-excitation is supplied by the shunt field 38 and the series field 39. The series field 39 is connected differentially so that the net excitation obtained from fields 38 and 39 is independent of changes in output loading. The excitation of the generator can be changed in magnitude and direction by the movable contact 22 because the control field 33 is always capable of supplying sufficient ampere-turns to cause the generator to build up or down throughout the range of the regulator.

Since the principal function of the servo-generator, at 34, is to amplify the input power controlled by the movable contact 22, it will be apparent that other means of amplification may be employed for this purpose without influencing the overall performance.

So long as keeping the gun on the target does not require movement of the former about the azimuth and elevation axes relative to space, that is, so long as the absolute angular velocities about these axes are zero, then the zero absolute velocity setting of the gyro is adequate to keep the gun on the target; however, if it is necessary to move the gun angularly relative to space in order to cause the gun to track the target, then it is necessary to set in the required absolute angular velocity. The latter result is accomplished by means of a biasing device effective to develop and apply a moment of the required magnitude and direction about the precession axis z—z. The moment so applied moves the gyro about the precession axis z—z to engage the movable contact 22 with either of the contacts 20 and 21, dependent upon the direction of the moment. Any tendency of the supporting structure to introduce a deviation in such set-in velocity would result in a gyro torque proportional to the velocity of deviation and which torque is added to or subtracted from the torque due to the biasing device, depending upon the direction of deviation, to minimize the latter, with the result that the absolute velocity setting provided by adjustment of the biasing device is preserved irrespective of any tendency of angular motion of the supporting structure to bring about deviation. Following contact engagement, the motor 15 rotates the turret about the azimuth or mounting axis a—a and relative to the structure 10. By varying the magnitude of such moment, the point at which the gyroscopic couple balances the moment is correspondingly varied, with the result that the contacts are operated to control the input of energy to the motor so that the gyro governs the motor for an absolute angular velocity corresponding to the moment magnitude. By reversing the moment, the absolute angular velocity is reversed.

Figure 5:
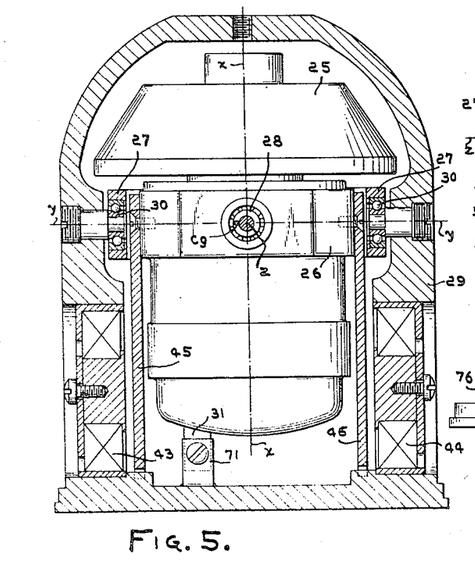
Fig. 5 is a sectional view taken along the line V—V of Fig. 6.
Figure 6:
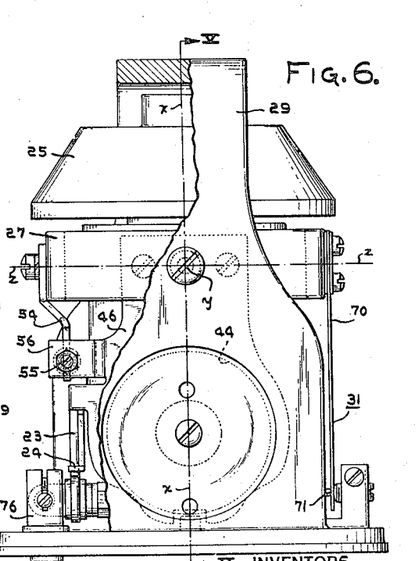
Fig. 6 is an elevational view at right angles to Fig. 3 and having part of the outer frame or casing broken away.
Figure 7:
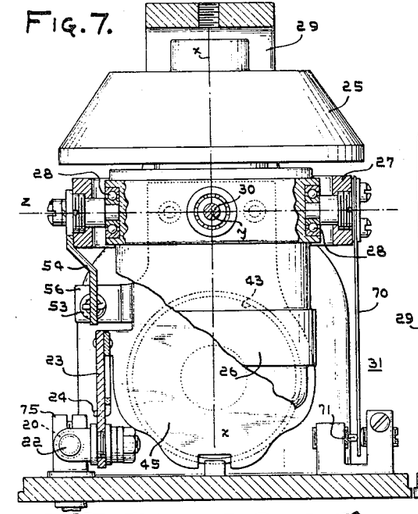
Fig. 7 is a view similar to Fig. 6 but showing certain of the parts in section.
Figure 8:
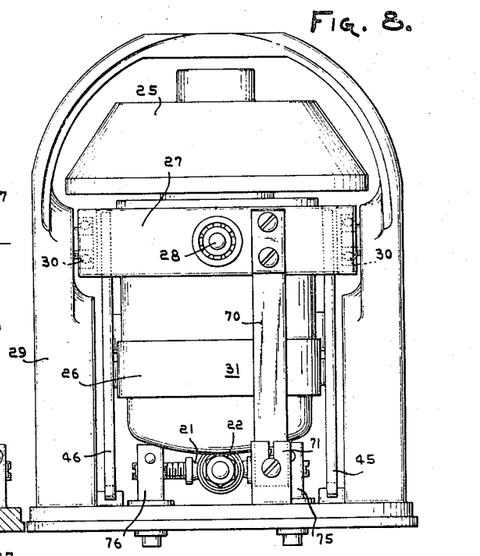
Fig. 8 is an elevation viewed from the back of Fig. 3.

As shown in Fig. 12, magnetic means is used for developing and applying moments to the gyro, at 16, about the precession or output axis z—z, such magnetic means including windings 43 and 44 carried by the outer frame structure 29 of the gyro, as shown in Fig. 5, and cooperating with armature elements 45 and 46, respectively, carried by the inner frame 26 of the gyro, the windings and their armature elements being operative to develop opposed moments about the precession axis.

Thus, it will be seen that there is provided a servo-motor system to control movement of a structure, for example, the gun or the turret, about an axis, the servo-motor system including a motor whose input is controlled in response to the magnitude and direction of the magnetic moment applied about the gyro output axis and to gyro torque effective about that axis. As the gyro is mounted on the structure so that the movement axis of the latter constitutes the gyro input axis, angular velocity of the structure about its movement or gyro input axis is accompanied by proportional torque of the gyro about its output axis and the motor is thereby controlled to move the structure about its movement axis at an absolute angular velocity whose direction and magnitude depend upon the direction and magnitude of the applied moment. If the applied moment is zero, then the apparatus operates to regulate for zero absolute angular velocity.

As shown in Fig. 12, the windings 43 and 44 are connected in series between opposite sides L+ and L— of the line by the conductors 47, 48 and 49. Also, the potentiometer, at 17, has its resistor 50 connected between opposite sides of the line and in parallel with the series-connected windings 43 and 44. A movable contact 51 engages the resistor 50 and it is connected to the conductor 48 between the windings 43 and 44. If the potentiometer contact 51 is moved upwardly, then it will be apparent that the potential of the conductor 48 will be raised with the result that the current flowing through the winding 43 is reduced and that flowing through the winding 44 is increased. On the other hand, should the potentiometer contact 51 be moved downwardly, then the potential of the conductor 48 will be reduced, thereby resulting in increase in current flowing in the winding 43 and reduction in the current flowing in the winding 44. Thus, the potentiometer contact 51 may be positioned along the resistor to vary differentially the currents flowing in the windings so that the differential, and consequently the magnetic moment, is variable from zero to a maximum in each direction.

The potentiometer, at 17a, of the control system, at 14a, for the elevation gyro includes a movable contact 51a for varying the direction and magnitude of moments developed about the precession axis z—z of the gyro, at 16a, carried by the gun 12.

Figure 3:
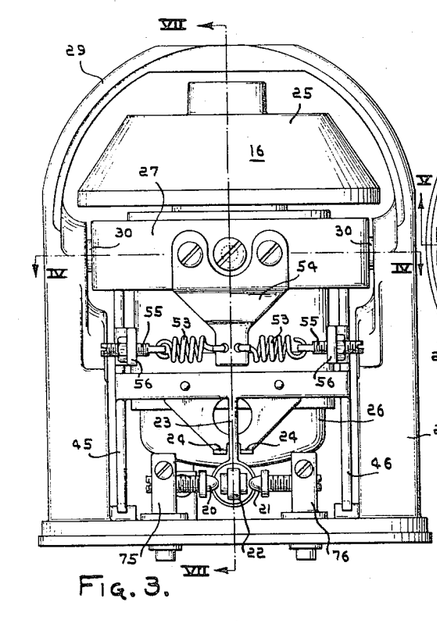
Fig. 3 is a front elevational view of one of the gyros.
Figure 4:
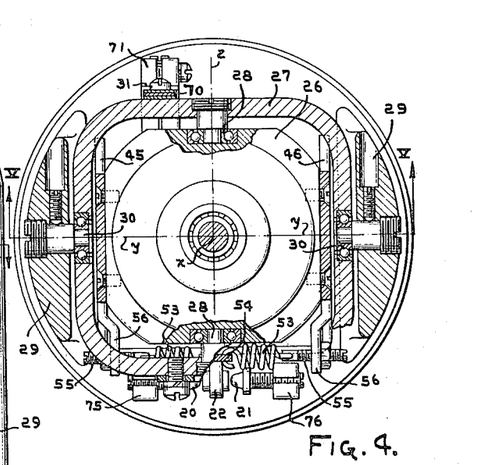
Fig. 4 is a sectional view taken along the line IV—IV of Fig. 3.
Figures 9, 10, 11:
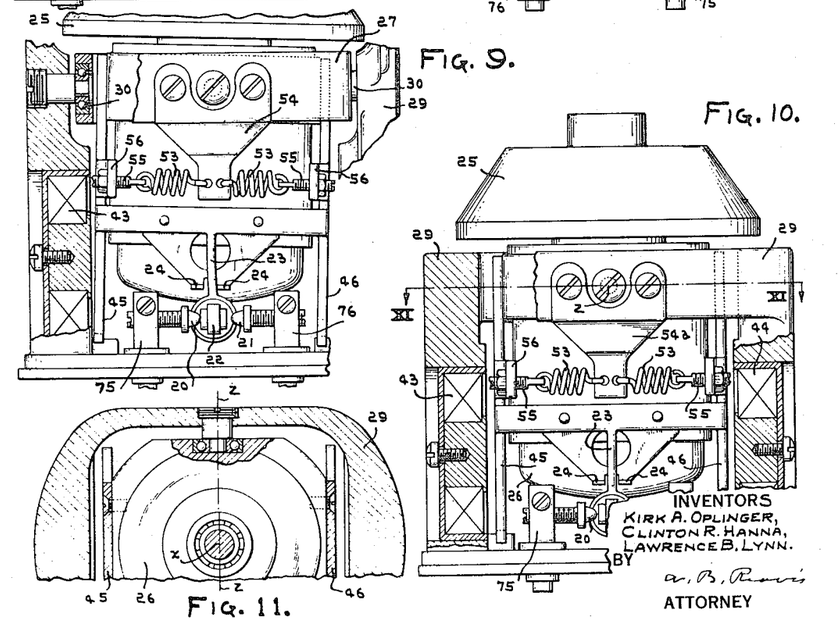
Fig. 9 is a fragmentary sectional view of apparatus shown in Fig. 3 with the gyro moved about the precession axis from central position.
Fig. 10 is a sectional view showing a second embodiment of the gyros.
Fig. 11 is a sectional view taken along the line XI—XI of Fig. 10.

As the magnetic arrangement just described has negative stiffness for the reason that the magnetic force of attraction varies inversely as the square of the distance between winding and the cooperating armature element, it is necessary to provide the gyro with centering springs effective about the precession axis and which are of just sufficient strength to overcome the negative stiffness. Accordingly, as shown in Figs. 3, 4 and 9, centering springs 53 have their adjacent inner ends connected to the depending arm 54 attached to the gimbal ring 27 and have their outer ends connected by adjusting screws 55 to brackets or arms 56 carried by the gyro inner frame. The springs 53, therefore, oppose angular movement of the gyro about the precession axis in response to moments developed by the magnetic means so as to give positive stiffness sufficient for centering and for stability with the gyro in centered position.

In Figs. 10 and 11, there is shown an embodiment wherein the gimbal ring is omitted, the inner frame 26 being pivoted directly about the precession axis z—z to the outer frame 29 attached to the supporting structure, as already described. This arrangement is adequate if undesired oscillatory disturbances are not transmitted from the supporting structure to the gyro. As shown in Fig. 10, moments are applied about the precession axis z—z, as already described in connection with Fig. 12, and centering springs 53 are used to overcome negative stiffness, the centering springs having their inner ends connected to a bracket 54a attached to the outer frame 29 and having their outer ends attached to the inner frame, as already described.

Figures 13, 16:
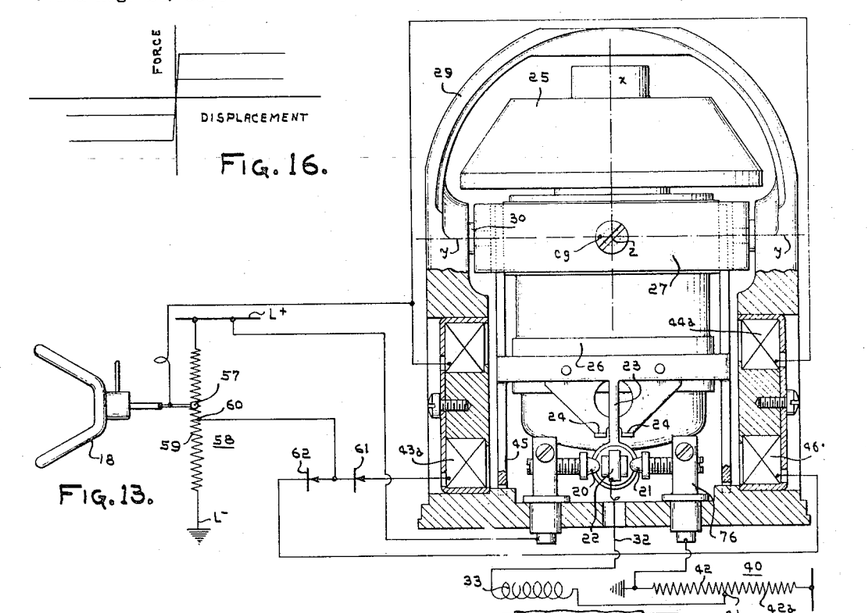
Fig. 13 shows a modified form of the controlling system and illustrates a third embodiment of the gyro.
Fig. 16 is a diagram showing the relationship of torque to displacement and pertinent to the filter means illustrated in Figs. 14 and 15.

In Fig. 13, there is shown an arrangement for energizing the magnetic means for developing moments about the precession axis which does not require the use of centering springs in order to overcome negative stiffness, this arrangement having the characteristic that the current is maintained in the windings at zero value when the movable contact 57 of the potentiometer, at 58, is in mid position, the contact 57 being movable along the resistor 59 of the potentiometer by one degree of freedom of the manually-controllable member 18. The other degree of freedom of the manually-controllable member is used to move a similar contact along the resistor of the potentiometer for the gyro effective about the elevation axis.

The windings 43a and 44a of the magnetic means are connected in parallel between the movable contact 57 and the tap 60 at the mid point of the resistor 59. Assuming that the upper end of the resistor 59 in Fig. 13 is at a higher potential than its lower end, then it will be obvious that, by moving the contact 57 upwardly in relation to the tap, the potential of the contact 57 will be increased in relation to that of the tap, and, with the one-way current device 61 arranged, as illustrated, current will flow from the contact 57 through the winding 43a and the one-way current device 61 to the fixed tap 60, the one-way current device 62 preventing the flow of current through the winding 44a. On the other hand, with the contact 57 below the tap 60, the potential of the latter will be higher, whereupon current will flow from the tap through the one-way current device 62 and the winding 44a to the tap 57, the one-way current device 61 then operating to prevent the passage of current through the winding 43a. With the movable potentiometer contact 57 at the mid position, it will have the same potential as the tap 60, with the result that zero current flows through the windings and there are no magnetic moments responsible for negative stiffness; and, in consequence, it is unnecessary to employ centering springs acting on the gyro about the precession axis z—z.

Figure 14:
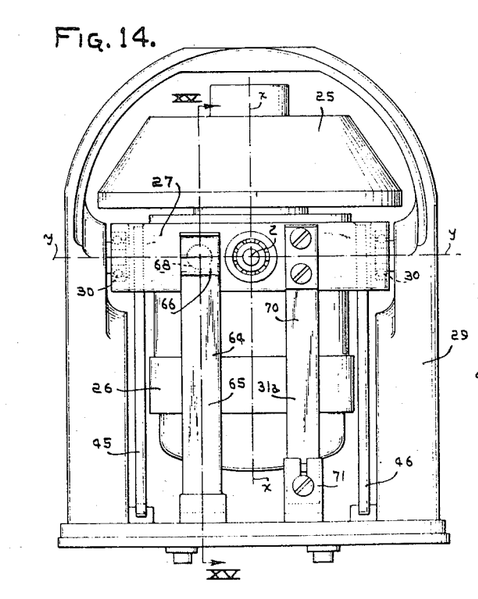
Figs. 14 and 15 are detail views showing filter means effective about the outer tilt axis of the gyro.
Figure 15:
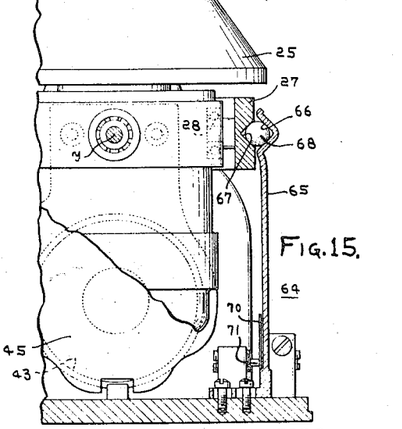

While, in Figs. 5, 6, 7 and 8, a damper connection, at 31, is shown between the gimbal ring 27 and the outer frame 29, improved performance is secured by the filter means illustrated in Figs. 14 and 15. The filter comprises a frictional damper connection, at 31a, and a spring device, at 64, including a spring 65, which is initially loaded with the gimbal ring 27 in mid position or centered with respect to the outer tilt axis y—y and which initial load is used to develop a large restoring force with relatively small displacements, as shown in Fig. 16. This spring operation may be accomplished by having a loaded spring 65 provided with a dihedral angle 66 which is in opposed relation with respect to a conical cavity 67 formed in the gimbal ring when the latter is centered about the outer tilt axis. A ball 68 is shown engaging in the recesses and serving as the means by which force of the spring 65 is applied to the gimbal ring. If the gimbal ring tends to be displaced from the mid position shown in Fig. 15, it can do so only by deflecting the spring 65, thereby picking up the load of the latter, with the result that a large centering force appears with practically no displacement, as indicated in Fig. 16. As friction torque of the damper 31a adds to spring restoring torque when displacement is increasing and subtracts therefrom when displacement is decreasing, it will be apparent that the filter is inherently capable of centering the gimbal ring providing the torque from the loaded centering spring is always greater than the friction torque. The loaded centering spring means, at 64, and the damper, at 31a, work together to provide a filter to prevent the transmission of undesired oscillatory disturbances from the outer frame or supporting structure to the gyro. The resisting torque of the spring means gives to the filter the characteristic of a rigid connection so far as the stabilizing operation is concerned, but such torque is overcome by disturbances of higher frequency with the result that the filter frees the gyro from the outer frame, and the gyro is protected from such disturbances and energy thereof is dissipated.

Preferably the dampers, at 31 and 31a, are each comprised by a suitable metallic strip 70 having its upper end attached to the gimbal ring 27 and having its lower end arranged to engage between surfaces provided on a suitable structure, at 71, carried by the base of the outer frame 29 attached to the supporting structure carrying the gyro. The friction surfaces provided by the structure, at 71, are preferably formed on some hard material, such as ceramic, so that the coefficient of friction may be maintained at a substantially constant value.

The fixed contacts 20 and 21 are shown as being adjustable with respect to supports 75 and 76 carried by the outer frame structure 29. By adjusting the contacts 20 and 21 with respect to the supports 75 and 76, the clearances thereof with respect to the intermediate contact 22 with the gyro centered may be properly related to the clearances between the stops 24, 24 and the spring bar 23 to secure the most effective operation with contact cushioning. All of said clearances are small, being of the order of a thousandth or so of an inch, they being exaggerated for illustrative purposes in the drawings.

To reduce sensitivity and increase stability, the contacts are preferably operated in a vibratory manner, that is, the gyro rotor has a certain amount of rotational unbalance. This vibration is obtained by introducing a small unbalance in the spinning body 25 shown in Figs. 3 to 9, inclusive, and indicated by the displaced center of gravity designated C. G. The spring arm 23 is so selected that its natural frequency of vibration is such that a forced vibratory condition away from resonance occurs with the result that the contact 22 is vibrated and stability of operation of the apparatus is increased.

While the velocity control system is peculiarly suitable for keeping the gun or a directable member on or tracking a target, it will be apparent that it may be used in any environment where the controlling mode of operation is useful, and that either the vertical or azimuth component thereof is susceptible of general application with the moment applied about the gyro precession axis developed, applied, and adjusted in any suitable manner, that is, in its broadest aspect, the invention comprises a structure whose angular movement about at least one axis is controlled in response to an applied moment and to torque of a gyro carried by the structure and related to the movement axis of the latter in such manner that the movement axis constitutes the gyro input axis so that angular velocity of the structure with respect to its movement axis is accompanied by proportional torque of the gyro about its output axis to regulate the absolute angular velocity of the structure with respect to its movement axis in response to the magnitude and direction of the applied moment. Further, while the gyro illustrated and described is peculiarly suitable as a component for governing absolute velocity, it will be apparent that it may be employed for any purpose to which its structure and mode of operation are adapted.

While the invention has been shown in several forms, it will be obvious to those skilled in the art that it is not so limited, but is susceptible of various other changes and modifications without departing from the spirit thereof.

What is claimed is:

1. In combination, a body member pivotally mounted for movement about first and second axes at right angles, motors for moving the body member about said axes, first and second gyros each having an output axis transverse to its rotor spin axis and which gyros are mounted in relation to the member with the first mounting axis of the latter extending transversely of the output and rotor spin axes of the first gyro and with the second mounting axis thereof extending transversely of the output and rotor spin axes of the second gyro so that angular velocities of the member about the first and second axes are accompanied by proportional torques of the first and second gyros, respectively, about their output axes, a controlling element having two degrees of freedom of movement, means utilizing movements of the controlling element along the paths of the respective degrees of freedom of movement thereof to apply moments to the respective gyros about their output axes so that the moments are applied in opposite directions to each gyro and are varied from minimum to maximum in each direction according to the position of the controlling element along the path of the corresponding degree of freedom of movement, and means utilizing movements of the gyros due to moments applied thereto about the output axes and to torques of the gyros about such axes to control the input of energy medium to the motors for operating the latter so that the direction and magnitude of absolute angular velocity of the body member about each mounting axis are governed in accordance with the position of the controlling element along the path of the corresponding degree of freedom of movement.

2. In combination, a member; means for pivotally mounting the member for movement about an axis; a motor for driving the member about its axis in either direction; a gyro including an inner frame, a rotor journalled in the inner frame, and an outer frame pivotally supporting the inner frame about an output axis extending transversely of the rotor spin axis; means for mounting the outer frame with respect to the member with the mounting axis of the latter extending transversely of said output and spin axes to constitute the input axis of the gyro so that angular velocity of the member about the mounting axis relative to space is accompanied by proportional torque of the gyro about the output axis; means for applying moments to the gyro about its output axis in opposite directions and operative to vary the moment from a minimum to a maximum in each direction; and means carried by the member and by the gyro and operated by movements of the latter about the output axis due to the moment applied to the gyro about the output axis and to torque of the gyro about such axis for controlling the input of energy medium to the motor to drive the member about the mounting axis so as to minimize deviations in absolute angular velocity thereof about such axis.

3. In combination, a supporting structure movable relative to space: a member pivotally mounted on the supporting structure: a reversible motor for moving the member in opposite directions about the mounting axis and relative to the supporting structure: and apparatus providing for operation of the motor so that, irrespective of movements of the supporting structure, deviations in angular velocity, including zero angular velocity, of the member about its mounting axis and relative to space are minimized: said apparatus comprising a gyro; said gyro including an inner frame, a rotor journalled in the inner frame, and an outer frame pivotally supporting the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis; means operative to apply moments to the gyro about its output axis in opposite directions and adjustable to vary the moment from minimum to maximum in each direction; means utilizing movements of the gyro due to the moment applied thereto about the output axis and to torque thereof about such axis to control the input of electrical energy to the motor and including a pair of spaced outer contacts connected to the member and an intermediate contact engageable and disengageable with the outer contacts; a bar spring connected at one end to the intermediate contact and at the other end to the gyro so that movement of the latter is effective to move the intermediate contact relative to the outer contacts; stops cooperating with the bar spring to limit the amplitude of movement of the latter and of the gyro about the output axis so that a limited amount of flexure of the bar spring may occur following engagement of the intermediate contact with either of the outer contacts; and means for effecting a vibratory condition of operation of the contacts comprising providing the rotor with a slight amount of unbalance cooperating with the spring action of the bar.

4. In combination, a supporting structure movable relative to space: a member pivotally mounted on the supporting structure: a reversible motor for moving the member in opposite directions about the mounting axis and relative to the supporting structure: and apparatus providing for operation of the motor so that, irrespective of movements of the supporting structure, deviations in angular velocity, including zero angular velocity, of the member about its mounting axis and relative to space are minimized: said apparatus comprising a gyro; said gyro including an inner frame, a rotor journalled in the inner frame, and an outer frame pivotally supporting the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis; magnetic means for applying moments to the gyro about its output axis in opposite directions and which is adjustable to vary the moment in each direction from a minimum to a maximum in each direction; said magnetic means including windings carried by the supporting structure and armature elements for the windings and carried by the gyro; and means utilizing movements of the gyro about its output axis and due to the applied moment and to gyroscopic torque about the output axis to control the supply of energy medium to the motor.

5. In a servo-motor system including a motor for driving a member about a mounting axis, a gyro; said gyro including an inner frame, a rotor journalled in the inner frame, and an outer frame pivotally supporting the the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis; means for applying a moment to the gyro in either direction about the output axis and adjustable to vary the magnitude of the moment in each direction; and means responsive to movement of the gyro about the output axis due to the applied moment and to torque of the gyro about the output axis to control the input of energy medium to the motor.

6. In a servo-motor system including a motor for driving a member about a mounting axis, a gyro; said gyro including an inner frame, a rotor journalled in the inner frame, and an outer frame pivotally supporting the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis; magnetic means for applying moments to the gyro in either direction about its output axis; means including an element movable from mid position in opposite directions for energizing the magnetic means so as to vary the magnitude of the moment in each direction and providing for a zero current condition when the element is in a mid position; and means responsive to movement of the gyro about the output axis due to the applied moment and to torque of the gyro about the output axis to control the input of energy medium to the motor.

7. In a servo-motor system including a motor for driving a member about a mounting axis, a gyro; said gyro including an inner frame, a rotor journalled in the inner frame, and an outer frame pivotally supporting the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis means for applying moments to the gyro in either direction about the output axis and adjustable to vary the magnitude of the moment in each direction; said means including a pair of opposed electromagnets, armature elements carried by the gyro and cooperating with the magnets, and means including an element movable from mid position in opposite directions for selectively energizing said magnets in a variable manner and providing a zero current condition therefor when the element is in mid position; and means responsive to movement of the gyro about the output axis due to the applied moment and to torque of the gyro about the output axis to control the input of energy medium to the motor.

8. In a servo-motor system including a motor for driving a pivotally-mounted member about its mounting axis, a gyro; said gyro including an inner frame, a rotor journalled in the inner frame, and an outer frame pivotally supporting the inner frame about an output axis extending transversely of the rotor spin axis; means for mounting the outer frame on the member with the mounting axis of the latter extending transversely of the output and spin axes to constitute the gyro input axis so that angular velocity of the member about the mounting axis and relative to space is accompanied by proportional torque of the gyro about the output axis; means for applying to the gyro about its output axis moments which vary in magnitude and direction; and means for controlling the input of energy medium to the motor in response to movement of the gyro about the output axis so that movement thereof due to the applied moment results in the supply of energy medium to the motor and movement thereof due to torque of the gyro about the output axis interrupts such supply.

9. In controlling apparatus for a reversible motor operative to control angular movement of a structure about an axis; a gyro including a frame, a rotor journalled in the frame, and means for pivotally supporting the frame about an output axis extending transversely of the rotor spin axis and mounted on said structure with said movement axis extending transversely of the output and spin axes to constitute the gyro input axis so that angular velocity of the structure about said movement or gyro input axis is accompanied by proportional torque of the gyro about the output axis; means operative to apply moments to the gyro about its output axis in opposite directions and adjustable to vary the moment from minimum to maximum in each direction; means responsive to movements of the gyro due to the moment applied thereto about the output axis and to torque of the gyro about such axis to control the input of electrical energy to the motor and including a pair of spaced outer contacts connected to the structure and an intermediate contact engageable and disengageable with the outer contacts; a bar spring carrying the intermediate contact and connected to the gyro so that movement of the latter about the output axis is effective to move the intermediate contact relative to the outer contacts and elastically deformable to provide for cushioned contact engagement; and stops for limiting the amplitude of movement of the bar spring and of the gyro about the output axis so that a limited amount of flexure of the bar spring may occur following engagement of the intermediate contact with either of the outer contacts.

10. In controlling apparatus for a reversible motor operative to control angular movement of a structure about an axis; a gyro including a frame, a rotor journalled in the frame, means for pivotally supporting the frame about an output axis extending transversely of the rotor spin axis and mounted on said structure with the movement axis of the latter extending transversely of the output and spin axes to constitute the gyro input axis so that angular velocity of the structure about said movement or gyro input axis is accompanied by proportional torque of the gyro about the output axis; magnetic means including windings effective, when energized, to apply moments to the gyro about the output axis in opposite directions; means for energizing the windings for the application of moments to the gyro about its output axis and adjustable to vary the moment from minimum to maximum in each direction; means responsive to movements of the gyro about its output axis due to the applied moment and to torque of the gyro about such axis to control the input of energy medium to the motor; and means acting on the gyro about its output axis to compensate for the effect of negative stiffness of the magnetic means.

11. Apparatus as claimed in claim 10 wherein the last-named means acting on the gyro about the output axis is comprised by springs.

12. In controlling apparatus for a reversible motor operative to control movement of a structure about an axis; a gyro including a frame, a rotor journalled in the frame, and means for pivotally supporting the frame about an output axis extending transversely of the rotor spin axis and mounted on said structure with the movement axis of the latter extending transversely of the output and spin axes to constitute the gyro input axis so that angular velocity of the structure about said movement or gyro input axis is accompanied by proportional torque of the gyro about the output axis; magnetic means for applying moments to the gyro about its output axis and in opposite directions and including windings fixed relative to said structure and armature means for the windings connected to move with the gyro as the latter moves about the output axis; resistance means adapted for connection to a supply of electrical energy, a pair of rectifiers, one connected in series with each winding, connected to a common tap on said resistance means, said rectifiers being disposed in reversed relation one with respect to the other, a movable contact on said resistor means, circuit means connecting said movable contact to the remaining terminal of each winding, said rectifiers providing for selective energization of the windings to the extent of the potential difference between the adjustable contact and the tap such that one winding is energized when the adjustable contact is positioned along a portion of the resistance means of higher potential than the tap and the other winding is energized when the adjustable contact is adjusted along a portion thereof of lower potential than the tap, whereby a zero current condition occurs when the adjustable contact and the tap are at the same potential; and means responsive to movements of the gyro about the output axis due to the applied moment and to torque of the gyro about such axis to control the supply of energy medium to the motor.

13. In controlling apparatus for a reversible motor operative to control movement of a structure about an axis; a gyro including an inner frame, a rotor journalled in the inner frame, an outer frame attached to said structure to move with the latter, a gimbal ring connected to the inner frame about an inner gimbal axis and connected to the outer frame about an outer gimbal axis parallel to said movement axis, the rotor spin axis extending in substantially normal transverse relation with respect to said movement axis and said inner gimbal axis being normal both to the rotor spin axis and to said movement and outer gimbal axes; means for applying variable moments to the gyro about said inner gimbal axis in opposite directions; a coupling connecting the outer frame and the gimbal ring and effective about the outer gimbal axis; said coupling including a damping means opposing relative movements of the outer frame and the gimbal ring with respect to the outer gimbal axis; and means responsive to motion of the inner frame due to the applied moment and to torque of the gyro about the output axis for controlling the supply of energy medium to the motor.

14. Apparatus according to claim 13 with a filter for resisting the transmission of oscillatory disturbances from the structure to the gyro, said filter comprising said coupling and its damping means and loaded spring means resisting displacement of the gimbal ring in opposite directions from a centered position with respect to the outer gimbal axis with torques which are large with practically no displacement.

15. In controlling apparatus for a reversible motor operative to control movement of a structure with respect to an axis; a gyro including a frame, a rotor journalled in the frame, and means for pivotally supporting the frame about an output axis extending transversely of the rotor spin axis and mounted on said structure with said movement axis extending transversely of the output and spin axes to constitute the input axis of the gyro so that angular velocity of the structure about said movement or gyro input axis is accompanied by proportional torque of the gyro about the output axis; means for applying moments to the gyro about its output axis and operative to control the direction and magnitude of the applied moment; and means operable in response to movements of the gyro due to the moment applied thereto about the output axis and to torque thereof about such axis to control the input of energy medium to the motor for operation of the latter to provide for an absolute angular velocity of the structure with respect to its movement axis dependent in direction and magnitude upon the direction and magnitude of the applied moment.

16. In controlling apparatus for a reversible motor operative to control movement of a structure with respect to an axis; a gyro including a frame, a rotor journalled in the frame, and means for pivotally supporting the frame about an output axis extending transversely of the rotor spin axis and mounted on said structure with said movement axis extending transversely of the output and spin axes to constitute the input axis of the gyro so that angular velocity of the structure about said movement or gyro input axis is accompanied by proportional torque of the gyro about the output axis; magnetic means for applying moments to the gyro about its output axis; means for energizing the magnetic means so as to control the direction and magnitude of the applied moment; and means operable in response to movements of the gyro due to the moment applied thereto about the output axis and to torque thereof about such axis to control the input of energy medium to the motor for operation of the latter to provide for an absolute angular velocity of the structure with respect to its movement axis dependent in direction and magnitude upon the direction and magnitude of the applied moment.

17. Apparatus as claimed in claim 16 wherein the means for energizing the magnetic means includes an element movable from mid position in opposite directions to control the direction and magnitude of the applied moment and means operative to provide for a zero current condition for the magnetic means when the element is in mid position.

18. In a control for a structure having freedom of movement about a plurality of axes, the combination of, motor means for each of said plurality of axes operative to effect movement of said structure about the respective axes of freedom, a gyro for each axis of freedom disposed with respect to its associated axis of freedom of said structure to respond to angular movement of said structure thereabout, and to have an output about an output axis thereof proportional to the velocity of angular movement of the structure about the corresponding axis of freedom, means for limiting the degree of angular movement of each gyro about the output axis thereof, control means constructed and arranged to apply moments in each direction to the respective gyros about the output axes thereof, and means responsive to movement of each gyro about the output axis thereof for controlling the supply of energy medium to each corresponding motor means.

KIRK A. OPLINGER.
CLINTON R. HANNA.
LAWRENCE B. LYNN.

REFERENCES CITED

The following references are of record in the file of this patent:

UNITED STATES PATENTS

| Number | Name | Date |
|---|---|---|
| 1,296,303 | Manley | Mar. 4, 1919 |
| 1,966,170 | Greene | July 10, 1934 |
| 2,014,825 | Watson | Sept. 17, 1935 |
| 2,233,918 | Fey | Mar. 4, 1941 |
| 2,373,990 | Barnhart | Apr. 17, 1945 |

FOREIGN PATENTS

| Number | Country | Date |
|---|---|---|
| 422,009 | Great Britain | Jan. 3, 1935 |
| 673,342 | France | Oct. 7, 1929 |
| 187,104 | Germany | July 20, 1907 |
| 616,248 | Germany | Aug. 1, 1935 |